United States Patent [19]

Eddy

[11] 4,247,058
[45] Jan. 27, 1981

[54] AXIAL FLOW CONTINUOUS LOOP FILM STORAGE SPOOL APPARATUS

[76] Inventor: Richard P. Eddy, 1450 W. Compton Blvd., #17, Gardena, Calif. 90247

[21] Appl. No.: 4,802

[22] Filed: Jan. 19, 1979

[51] Int. Cl.³ .................... G03B 21/00; G11B 23/08; G11B 23/12

[52] U.S. Cl. ................... 242/55.17; 226/118; 352/128

[58] Field of Search ............... 242/55.17, 55, 179; 352/126, 128; 226/118

[56] References Cited

U.S. PATENT DOCUMENTS

| | | | |
|---|---|---|---|
| 1,433,190 | 10/1922 | DeVilbiss | 242/55.17 |
| 2,506,942 | 5/1950 | Seeburg | 242/55.17 |
| 3,019,421 | 1/1962 | Saylor | 242/55.17 |
| 3,380,683 | 4/1968 | Yamamoto et al. | 242/55.17 |

Primary Examiner—Billy S. Taylor
Attorney, Agent, or Firm—Stuart Lubitz

[57] ABSTRACT

This invention provides for the edgewise storage of a filmstrip in the cavity between two concentric drums. The filmstrip is wound into the cavity between the two drums by a feed roller and pressure rollers as the drums rotate synchronously. The feed roller, in conjunction with the pressure rollers, serve to advance the filmstrip through the cavity, thereby providing storage for a considerable length of film. Since the film is pushed through the cavity to the opposite end, and made available there for use, the invention is especially appropriate for applications requiring endless loop filmstrips. The cavity formed by the drums may be of constant diameter (if the drums are cylindrical), arcuate, tapered, etc., depending upon the shapes of the corresponding surfaces of the concentric drums.

27 Claims, 12 Drawing Figures

AXIAL FLOW CONTINUOUS LOOP FILM STORAGE SPOOL APPARATUS

BACKGROUND OF THE INVENTION

1. Field of the Invention

The disclosed invention provides an apparatus for the storage of filmstrip material, especially suitable for endless loop applications.

2. Prior Art

The traditional manner for storage of filmstrip materials is in a reel, where the film is wound about itself so that each layer of the film contacts the layers above and below it. Such a film storage method is utilized in many applications, e.g., magnetic film reels such as cassettes or cartridges, movie film reels, etc. It is the traditional method for storing lengths of filmstrips. The advantage that such a storage method has is that the apparatus required to create such a reel of film is easily supplied.

There are two principal disadvantages to such film storage techniques. First, each layer of the film is in full contact across the entire width of the film with adjacent layers of the filmstrip. If the filmstrip contains information which can be altered or obliterated by dust or other materials caught between the layers of the wound filmstrip, such storage techniques require special consideration be given to maintain the cleanliness of the filmstrip in order to preserve the information on the filmstrip. Second, certain applications require the film to be continuously played. These applications, commonly referred to as "endless loop" applications, require special apparatus for the continuous circulation of the filmstrip.

Endless loop reel apparatus can be divided into two broad classifications. The first is one, such as the "8-track" magnetic film cartridge used for automobile sound playback, in which the magnetic film is formed into a loosely wound reel. The film is so loosely wound that it can be spooled on the outside of the reel and removed from the hub of the reel in a continuous manner. Unfortunately such types of endless loop apparatus requires a specially treated filmstrip which is able to easily slide across itself as it is loosely coiled. Special lubricants are used in the filmstrip material to allow this. When the lubricants loose their effectiveness, either by drying up or by being physically removed by use of the filmstrip, the apparatus turns into a self-destruct mechanism for the enclosed filmstrip material due to the binding of the layers of the film.

The second traditional method for providing filmstrips in an endless loop type application is for the providing of two reels for the storage of the film. By appropriate threading of the film, it is possible to create a film path such that initially the entire filmstrip is stored on one reel, and is transported across the projector, recorder, or other filmstrip utilization device to the other reel. The reel apparatus must allow for the feeding of the filmstrip from either of the reel assemblies since the film is moved from one reel to the other and back to the first reel again. This type of apparatus requires two reel assemblies, each sufficiently large to contain the entire filmstrip. Where a considerable amount of film is utilized, the floor space involved in providing for storage space for the two reel assemblies is considerable. In addition, such apparatus requires considerable mechanical complexity due to the complicated threading of the film and to the sophisticated methods for creating appropriately formed film reels.

It is an objective of the herein disclosed invention to provide a method for storing endless loop filmstrips in which a minimum amount of floor space is required, and in which a gentle storage method is provided, causing the filmstrip to minimally contact itself, thereby reducing the potential for injury to the filmstrip. It is a further objective to provide a method for automatic adjustment of the feeding of the filmstrip suitable for a variety of film speeds.

SUMMARY OF THE INVENTION

The hereindisclosed invention provides a compact apparatus for the edgewise storage of filmstrips in the cavity formed by two synchronously rotating drums. The filmstrip comes into minimal contact with itself while being stored, thereby reducing or eliminating the likelihood of damage to the filmstrip due to the storage mechanism. The invention is ideal for unattended operation where a filmstrip must be played continuously. The apparatus is simple in design, has a minimum number of moving parts, and is suitable for all types of filmstrips, whether sprocketed or unsprocketed. In addition the apparatus is not sensitive to the thickness of the filmstrip or to the length of the filmstrip, and can be adjusted for a variety of widths of filmstrips.

BRIEF DESCRIPTION OF THE DRAWINGS

FIG. 8 is a diagrammatic representation of the tension lever and film threading for the return roller;

DETAILED DESCRIPTION OF THE EMBODIMENT

Figure 1:
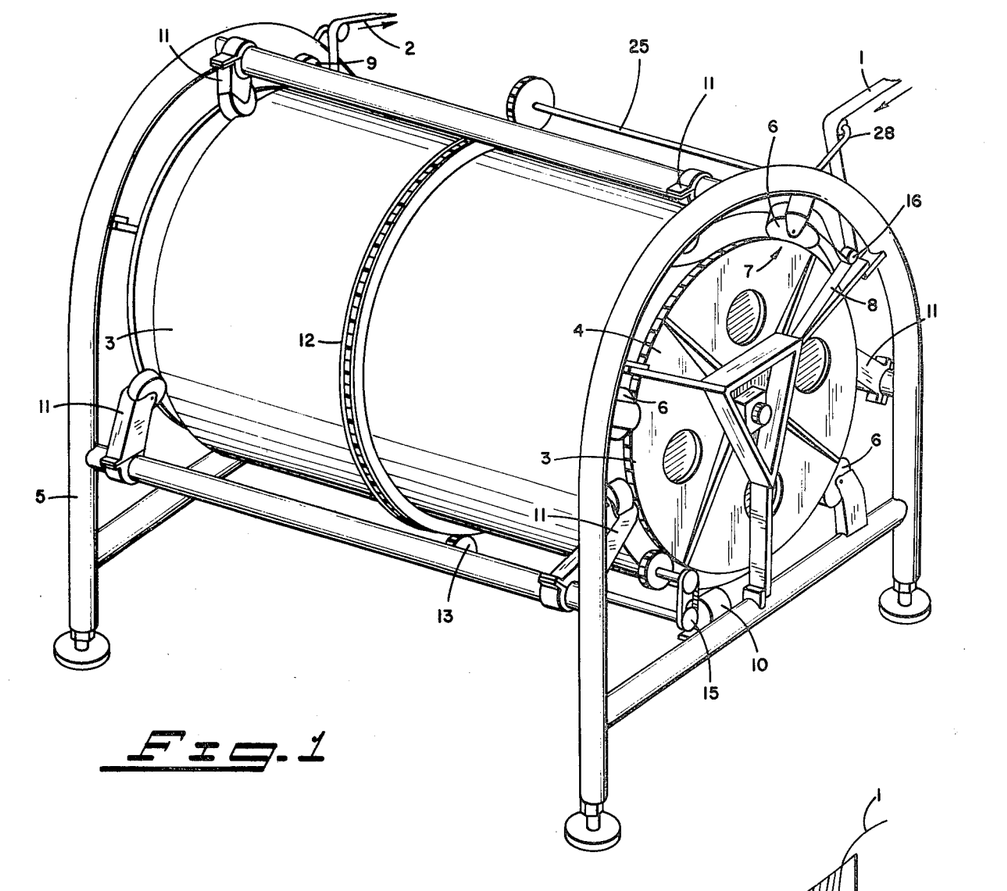
FIG. 1 is a perspective view of an embodiment of the invention.

FIG. 1 is a perspective view of an embodiment of the hereindisclosed invention. The illustrated apparatus has a frame 5 which provides a solid support for the various components of the apparatus. Housed within the frame 5 is an outer drum 3 and an inner drum 4. These two drums are concentrically positioned and able to rotate within the frame 5 due to a motor 10 and indicated drive system mechanisms 13, 15. The outer drum 3 is supported by a plurality of support rollers 11 which are evenly spaced about the circumference of the outer drum 3 and attached to the frame 5. A filmstrip is shown entering 1 the apparatus and exiting 2. The entering filmstrip 1 is positioned around several film guides 28, 16 and across a tension lever 8. This lever controls the rate of rotation of the two drums 3, 4 by measuring the tension of the filmstrip entering the apparatus. Equally spaced around the periphery of the drums are several pressure rollers 6 which are used to insert the film into the film storage cavity 20 formed by the difference in diameters of the two drums 3,4. Partially visible in FIG. 1 is the feed-roller assembly 9 which is used to assist the exiting filmstrip.

Figure 2:
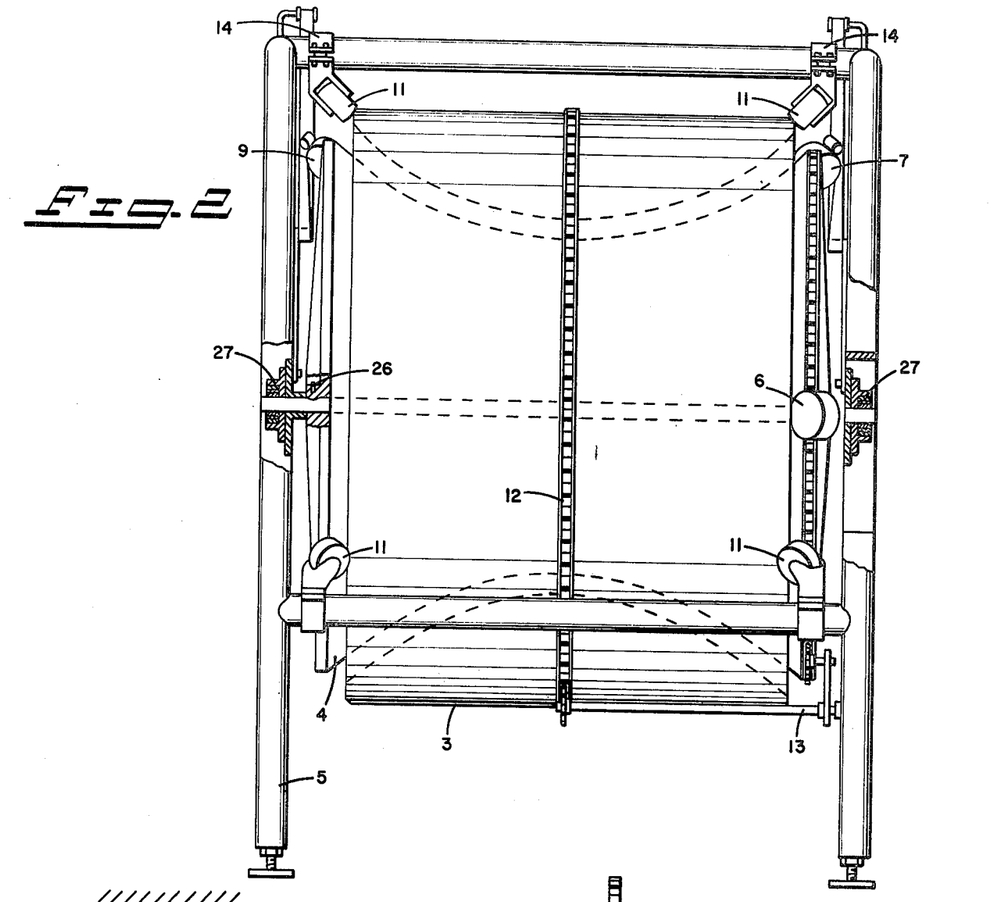
FIG. 2 is a side view of the embodiment shown in FIG. 1.

FIG. 2 is a side view of the embodiment portrayed in FIG. 1. More clearly portrayed in FIG. 2 are the support rollers 11 for the outer drum. These support rollers 11 allow the outer drum 3 to be rotatable with respect to the frame 5 without axial movement. The inner drum 4 is supported by its shaft 26, said shaft being connected to the frame 5 via appropriate bearing assemblies 27.

The outer drum 3 has a gear ring 12 mounted around it. Gear ring 12 is driven by the outer drum drive mechanism 13, which itself is driven by a motor 10, so as to allow for the controlled rotation of the outer drum 3.

The support rollers 11 are clamped to the frame of the apparatus, so as to allow for the appropriate adjustment or removal of the outer drum 3 when necessary.

Figure 3:
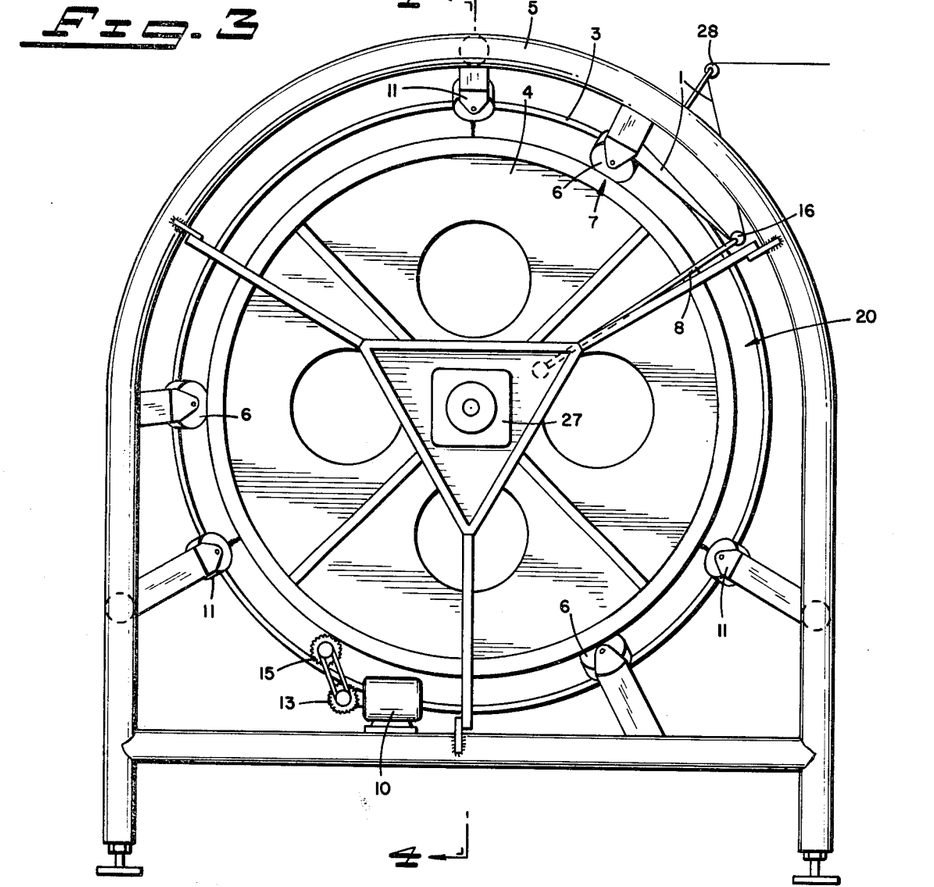
FIG. 3 is an axial view of the embodiment, showing the return roller assembly and motor.

FIG. 3 is a view of the axial end which has the mechanisms for handling the filmstrip entering the apparatus. The entering filmstrip 1 is supported by the entering film guide 28 and is thereby directed to the tension lever film guide 16 which is itself attached to the tension lever 8. From the tension lever film guide 16 the filmstrip is directed to the return roller assembly 7.

The return roller assembly 7 has a pressure roller 6 which is positioned in the film storage cavity 20 formed by the inner drum 4 and the outer drum 3. The purpose of the return roller assembly 7 is to suitably position the filmstrip on the edge in the gap between the two drums 3, 4 so as to cause the edgewise winding of the filmstrip between the inner 4 and outer drums 3 as they synchronously rotate. In addition to the return roller assembly 7, there are two pressure rollers 6 which are spaced at an equal distance around the axial edge of the inner drum 4 so as to suitably push the newly wound filmstrip material into the cavity 20 between the drums, thereby advancing all the filmstrip layers in the cavity toward the opposite end of the cavity 20.

Motor 10 is used to drive both the inner 4 and outer 3 drums in a synchronous manner such that there is no relative movement between the surfaces of the two drums. As previously mentioned, the outer drum 3 is driven via a gear ring 12 attached around its circumference. In addition, the inner drum is driven via its inner drum drive mechanism 15.

Figure 4:
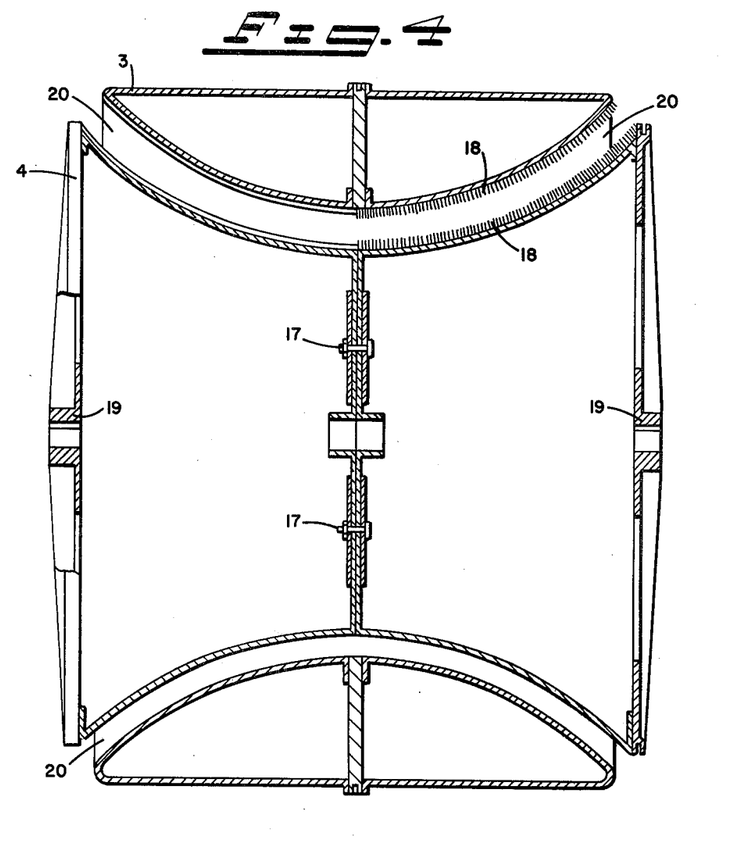
FIG. 4 is a sectional view along the rotational axes of the inner and outer drums.

FIG. 4 is a side sectional view of the inner drum 3 and outer drum 4. The surfaces of the drums in proximity to each other are cooperatively shaped to form a film storage cavity 20 which extends from one axial end to the other. The film storage cavity 20 has width sufficient for the edgewise storage of the filmstrip. By appropriate adjustment of the size and shape of the inner 4 or outer drum 3, the width of the cavity 20 can be appropriately increased or decreased to accommodate films of different widths. In this embodiment the inner drum 4 has an arcuate surface which would not permit the removal of the inner drum 4 from the outer drum 3 unless the inner drum were separable. The inner drum fastening assembly 17 permits the separation of the axial halves of the inner drum 4. Portrayed in FIG. 4 is a pair of brush guides 18, which are on the surface of both the inner 4 and outer drums 3. The brush guides 18 are used to assist in the support of the film as the film travels from one axial end of the device to the other. Further properties and characteristics of the brush guides 18 will be described below.

The inner drum is supported by its inner drum shaft supports 19 on the inner drum shaft 26, which are attached to the apparatus frame 5.

Figure 5:
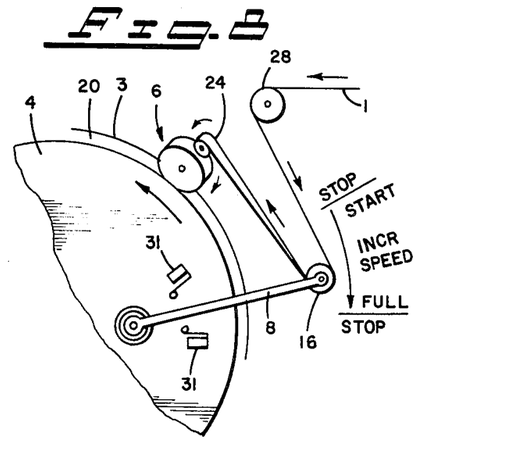
FIG. 5 is a diagrammatic representation of the loops formed by the film layers on the inner drum.

FIG. 5 is a diagrammatic representation of the loops formed by the filmstrip layers as they travel form one axial end of the device to the other. The inner 4 and outer 3 drums contain pairs of brush guides 18, the pairs equal in number to the pressure rollers 6, which are used to support the filmstrip layers. The pressure rollers 6 come into simultaneous contact with the brush guides 18 as the drums 3,4 rotate. The pressure rollers 6 thereby simultaneously advance the filmstrip into the cavity 20, whereupon the brush guides 18 immediately support the entering filmstrip 1. The entering filmstrip 1, as it is wound into the cavity 20, tends to curve between the brush guides 18. This slight loop is caused by the fact that the filmstrip is supported edgewise and must bend around the circumference of the inner drum 4. The amount of loop which is formed is determined by the width of the film with respect to the initial diameter of the inner drum 4 and by the ratio of the longitudinal velocity of the film entering the cavity 20 to the longitudinal velocity of the cavity 20. As the film layers proceed into the center of the film storage cavity 20, the decreasing diameter of the drums 3, 4 cause the film loops to become more arched. The film is supported at the brush guides 18 and allowed to freely curve between the brush guides 18. Due to the loops, each filmstrip layer tends to not contact adjacent layers except at the brush guides 18 since the layers are each curved in a slightly different amount. The looping of the filmstrip also serves to assist in the support of the filmstrip as it moves through the cavity.

The formation of the loops by the filmstrip is beneficial in that it separates the film layers, thereby reducing the likelihood of injury to the surface of the filmstrip. Additionally, the loops assist in supporting the filmstrip as the filmstrip moves from one axial end of the device to the other. Finally, the loops aid in the relief of tensions in the filmstrip layers caused by the transportion of the layers from one axial end to the other. The exact shape of the loops formed is not critical.

Figure 11:
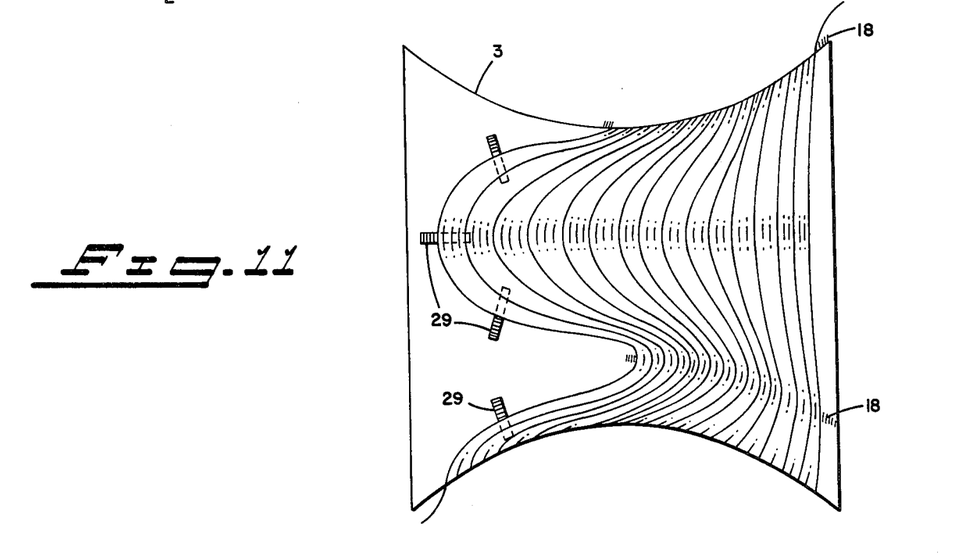
FIG. 11 is a diagrammatic representation of an alternative arrangement for the brush guides.

It is not necessary that the brush guides 18 extend from one axial end to the other. Generally the loops formed by the film layers loop from the center of the film storage cavity 20 to the axial end in proximity to the feed roller assembly 9. In essence, the first half of the film storage cavity 20 is used for film strip retention, whereas the second half is used for storage of the film loops. Inasmuch as the film is being drawn from the second half of the cavity 20, it is not highly critical as to whether the brush guides extend the entire length of the cavity 20. Depending on the thickness of the film, the width of the film, and the amount of film stored, the brush guides 18 for the second half of the drum can be appropriately designed to provide the corresponding amount of resistance necessary to smoothly remove the filmstrip from the cavity. In certain circumstances, it has been found that in order to provide the proper amount of support for the film loops, loop brush guides 29, one embodiment of which is illustrated in FIG. 11, are useful to support loops of the filmstrip in the second half of the drum. FIG. 11 suggests that the brush guides 18 extend only half way across the drums, whereupon the loops are supported by separate individually spaced loop brush guides 29. Other suitable arrangements of brush guides 18 will be apparent to those skilled in the art.

As an alternative method for preventing the film loop from moving, the apparatus may be readily designed so that the inner 4 and outer 3 drums are vertical, allowing removal of the filmstrip from the lower axial end. With such an arrangement, due to the force of gravity, the shifting of the film loops is reduced.

Figure 6:
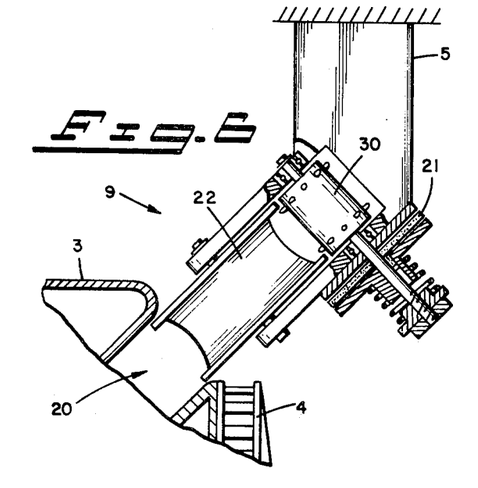
FIG. 6 is a detailed view of the feed roller assembly.

FIG. 6 is a detail of the feed roller assembly 9 which is used to remove the film from the apparatus. Positioned between the inner 4 and outer drum 3 in the film storage cavity 20 is a roller 22 which guides the film out of the cavity 20 onto a sprocket 30. If necessary, the roller 22 may be appropriately positioned in the cavity 20 to cause the existing filmstrip 2 to twist, thereby causing the gentle release of the filmstrip from the brush guides 18. The sprocket 30 has its shaft attached to the frame 5 of the apparatus via a roller clutch 21, which creates an adjustable tension on the exiting filmstrip 2 so as to properly feed the device being supplied with film.

Figure 7:
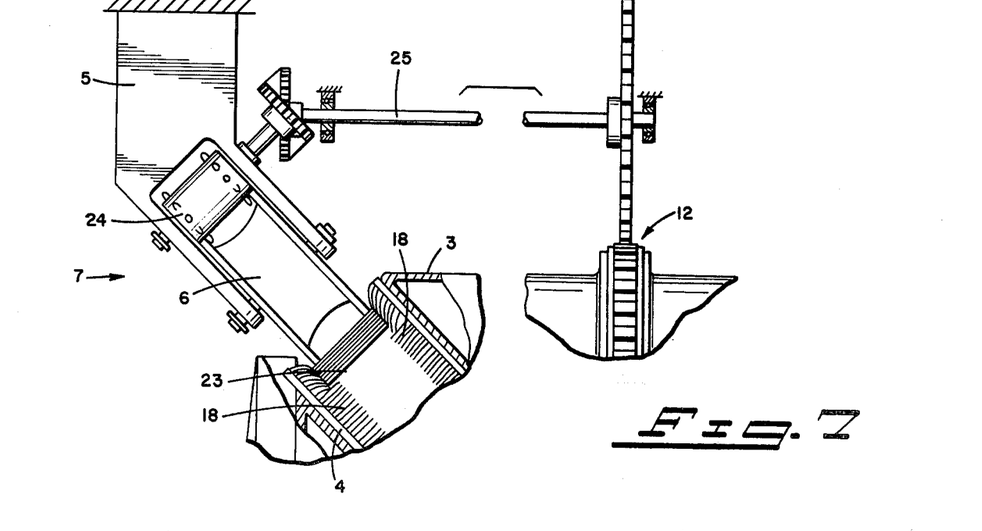
FIG. 7 is a detailed view of the return roller assembly and associated drive mechanism.

FIG. 7 is a detail of the return roller assembly 7. The return sprocket 24 is driven by a drive mechanism 25 which is engaged with the outer drum ring gear 12, so as to cause film to be supplied at a rate commensurate with the rotational speed of the drums 3, 4. The return roller assembly 7 includes a pressure roller 6 which is positioned between the inner 4 and outer 3 drums in the film storage cavity 20. The entering filmstrip 1 is threaded around the return sprocket 24 and pressure roller 6 into the film storage cavity 20, thereby advancing, with the assistance of the pressure roller 6, the filmstrip layers 23 which were previously wound into the film storage cavity 20.

In order to provide an apparatus which is self regulating as to the rotational speed of the drums 3,4, allowing use of the apparatus with a variety of filmstrip utilization devices, a tension lever 8 is used to adjust the speed of the drum assemblies so as to store the film as it is supplied, even with a fluctuating supply rate. The entering filmstrip 1 is passed around the entering film guide 28 to the tension lever film guide 16. From there the film goes to the return sprocket 24 and its associated pressure roller 6 into the cavity 20. The tension lever 8 is spring biased and limited to movement between two limits switches 31. If the feed rate of the film increases, tension lever 8 will move appropriately, causing an increase in the rotational rate of the inner 4 and outer 3 drums. As the speed of the drums increases, the tension lever is appropriately moved, slowing the rotational rate of the drums. In the event that the entering filmstrip 1 breaks, or that the inner 4 and outer 3 drums cannot be driven at a rate appropriate for the entering filmstrip 1, one or the other of the limit switches 31 will be triggered by the tension lever 8, thereby stopping the rotation of the drums, and turning the apparatus off.

In an alternative embodiment, the exiting filmstrip 2 may be threaded around an exiting filmstrip tension lever similar in design to the above tension lever. This lever would not serve to control the speed of rotation of the inner 3 and outer 4 drums, but would only be used when the filmstrip is being threaded through a projector, recorder, or other filmstrip uutilization apparatus. During this threading process, the apparatus operator would activate the exiting filmstrip tension lever assembly, which would permit it to rotate the drums 3,4 as required to make filmstrip available for threading. Once the filmstrip is threaded, the existing filmstrip tension lever would be disabled from controlling the rotation of the drums 3,4.

Figures 9, 10:
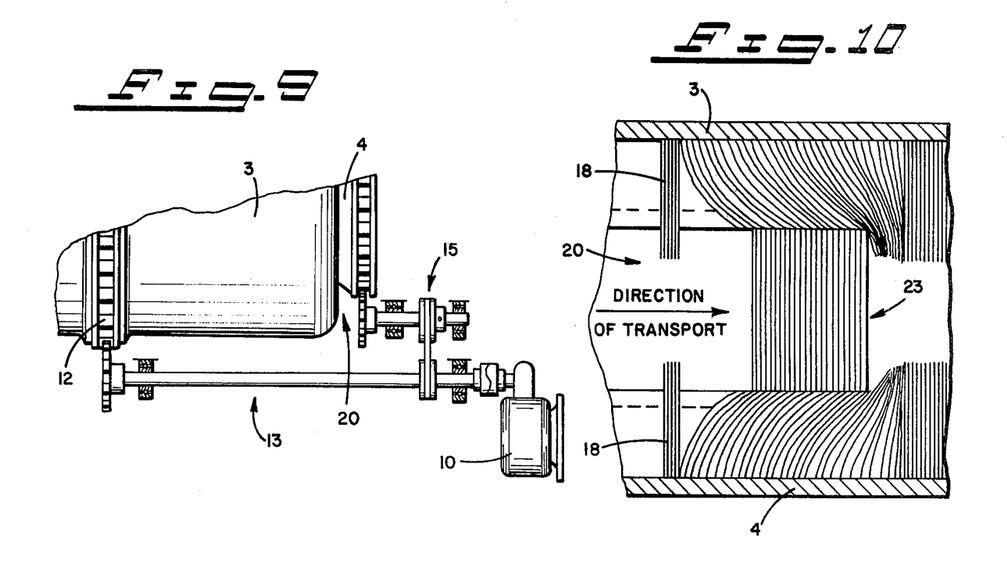
FIG. 9 is a detail of the inner and outer drum drive mechanisms.
FIG. 10 is a detailed view of a portion of the cavity between the inner and outer drums, illustrating the supporting function of the brush guides for the film.
Figure 9:
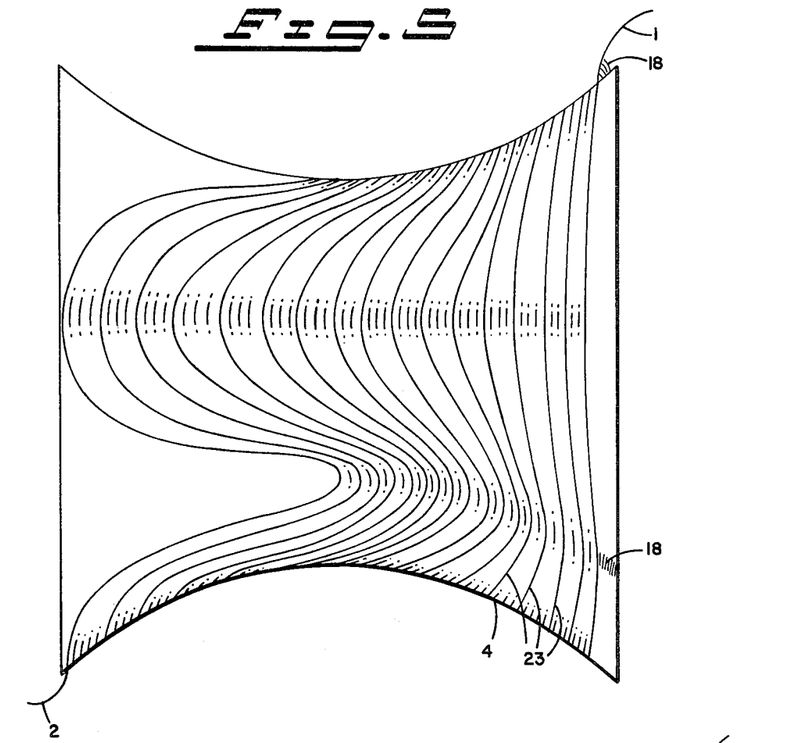

The inner 3 and outer 4 drums are driven at an identical rotational velocity, via the inner drum drive mechanism 15 and the outer drive mechanism 13. Suitable gearing is provided so that there is no relative movement between the corresponding surfaces of the inner 4 and outer 3 drums, so that a suitable cavity 20 for the filmstrip is provided.

In addition to the previously mentioned role of supporting the filmstrips, the brush guides 18 also serve to prevent the filmstrip layers 23 from moving against the direction of transport. The brush guides 18 may be constructed of bristles of nylon-like material, of appropriate length and resiliency to provide suitable support for the filmstrip layers 23. In order to allow the filmstrip to be removed easily from the apparatus, at the point in the cavity 20 in which the filmstrip is removed, the brush guide bristles may be either shortened, or of more flexible material, to reduce the force required for removal of the filmstrip from the film storage cavity 20. As previously mentioned, the exact format of the brush guides 18 is not highly critical to the invention, and alternative placement schemes for the brush guides 18 are equally effective.

Figure 12:
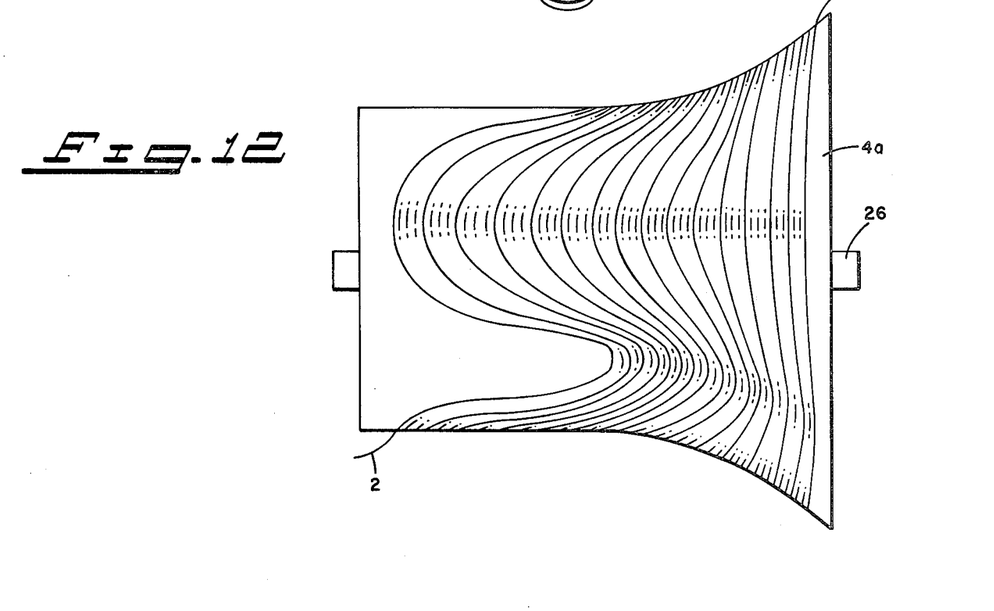
FIG. 12 is a second embodiment of the inner drum.

Due to the shape of the inner drum 4, in which the diameter of the inner drum 4 is greater at both axial ends than in the center of the drum 4, the previously described embodiment does not allow for the easy removal of the inner drum 4 without disassembly. Although the inner drum 4 is removable via its fastening assembly 17, alternative configurations, as illustrated in FIG. 12, for the inner 4a and outer drums are possible which allow for the removal without disassembly, of the inner drum 4a. At the axial end in which the entering filmstrip 1 is wound, the inner drum 4a is at a maximum diameter. The diameter of the drum decreases until it reaches a value which is held constant throughout the remaining length of the drum. Such an inner drum 4a is easily removable from the outer drum. Due to the decreasing diameter of the drum, film loops are formed, as previously discussed. Other possible shapes for the inner and outer drums are equally feasible. For instance, the drum may be tapered, or cylindrical. The invention should not be understood to be limited to the specified film storage cavity shapes, or to the specified locations of the film guides.

As will be apparent to a person skilled in the art, the teachings of the herein disclosed invention may be modified in form or detail without departing from the spirit and scope of the invention. Accordingly, the scope of the invention is to be limited only by the claims.

I claim:

1. A device for the storage of filmstrips or arbitrary length, said filmstrips having a more or less constant width, said width small in comparison to said filmstrip length, comprising:
  inner support means, having an outer surface with axial symmetry, for forming the inner side of a axially symmetrical film storage cavity;
  outer support means, having an inner surface with axial symmetry, said outer support means concentrically located, and cooperatively shaped with said inner support means, for forming the outer side of said film storage cavity;
  said film storage cavity edgewise supporting layers of filmstrip wound around said cavity, said cavity having a more or less constant width commensurate with the width of said filmstrip, said cavity width determined by the cooperative shapes of said inner and outer support means;

a frame, concentrically positioning said inner and outer support means with respect to each other, thereby providing a common axis of symmetry for said inner support means, outer support means and cavity; and drive means, attached to said frame, for controlably rotating in synchronism said inner and outer support means about said axis of symmetry.

2. A device according to claim 1 wherein said device comprises insertion means, attached to said frame in proximity to an axial end of said cavity, for feeding said filmstrip into said cavity when said inner and outer support means are rotating, such that only filmstrip edges contact said inner and outer support means.

3. A device according to claim 1 wherein said inner and outer support means are configured to form said cavity with a constant radius along said axis of symmetry.

4. A device according to claim 2 wherein said inner and outer support means are shaped such that a section of said cavity passing through said axis of symmetry is generally arcuate at the axial end in proximity to said insertion means, said cavity having a maximum radius at said axial end.

5. A device according to claim 4 wherein said cavity section is generally arcuate from one axial end to the other, with the radius of said surface generally the same at both axial ends.

6. A device according to claim 4 wherein said arcuate section of said cavity extends generally halfway its axial length from said insertion means, whereupon a generally constant sectional radius is maintained for its remaining length.

7. A device according to claim 2 wherein said insertion means comprises a plurality of rotatable pressure rollers equally spaced around the circumference of said cavity, each such pressure roller having its rotational axis in a generally radial direction with respect to said axis of symmetry of said cavity, said pressure rollers cooperating to retain said filmstrip in said cavity, while also cooperating to advance said windings of filmstrip through said cavity as said inner and outer support means are rotated and new filmstrip is fed into said cavity.

8. A device according to claim 7 wherein said insertion means comprises a filmstrip guide means for the edgewise positioning of said filmstrip as it is fed into said cavity.

9. A device according to claim 8 wherein said filmstrip guide means comprises a guide roller having width commensurate with said filmstrip width, said guide roller being driven by said drive means in synchronism with said inner and outer support means to feed filmstrip to said cavity at a rate commensurate with the ability of said cavity to store said filmstrip.

10. A device according to claim 8 wherein said filmstrip contains sprocket holes, and said filmstrip guide roller comprises a sprocketed roller for engaging said filmstrip.

11. A device according to claim 1 wherein attached to at least one of said cavity surfaces is a brush means for the retaining of said filmstrip in said cavity and for the prevention of the reversal of direction of movement of the filmstrip layers as they move through said cavity.

12. A device according to claim 7 wherein protruding from said surfaces of said inner and outer support means are brush means equal in number to said pressure rollers, said brush means being equally spaced around the circumference of said surfaces;

said pressure rollers coming in proximity with said brush means as said inner and outer support means rotate, so as to cooperate with said brush means to retain said filmstrip.

13. A device according to claim 2 wherein said insertion means comprises a tension sensing means, cooperating with said filmstrip, for the regulation of the rotation rate of said inner and outer support means in cooperation with the rate at which filmstrip material is supplied to said film storage device.

14. A device according to claim 13 wherein said tension sensing means comprises limit switches which indicate when the rotation of said inner and outer support means should be stopped if either filmstrip material is no longer being supplied to said filmstrip storage device or if it is being supplied at a rate greater than that capable of being stored in said cavity.

15. A device according to claim 7 comprising plural brush means attached to said inner and outer support means, each brush means attached to said inner support means being uniquely associated with a brush means on said outer support means of similar length and shape, elements of each said pair in close proximity to each other, for the retaining of said filmstrip in said cavity and for the prevention of the reversal of direction of movement of the filmstrip layers as they move through said cavity.

16. A device according to claim 15 wherein said brush means pairs at the insertion means axial end of said cavity are equal in number to said pressure rollers and equally spaced around said axial end of said cavity so as to permit said pressure rollers to come into simultaneous proximity with said pairs as said inner and outer support means rotate.

17. A device according to claim 16 in which said brush guide pairs in proximity to said insertion means extend axially in said cavity for about half the length of said cavity.

18. A device according to claim 16 in which said brush guide pairs in proximity to said insertion means extend axially in said cavity for the length of said cavity.

19. A device according to claim 15 wherein the elements of each said brush guide pair is positioned in said cavity in a direction normal to the curve taken by the filmstrip layers between the elements of said pair.

20. A device according to claim 15 wherein said brush means are of nylon bristle construction, said bristles having varying resiliency and length for retention of said filmstrip layers with minimum pressure.

21. A device according to claim 1 wherein said inner support means has a tapered shape, thereby allowing for the removal of said inner support means from said outer support means via an axial end without the disassembly of said inner support means.

22. A device according to claim 1 wherein said inner support means is separable, allowing for the removal of said means from said apparatus without further device disassembly required.

23. A device according to claim 1 wherein said outer support means has a cylindrical outer surface and is supported by plural support rollers, said rollers attached to said frame and equally spaced around the periphery of each axial end of said outer support means.

24. A device according to claim 1 further comprising removal means, in proximity to an axial end of said cavity, attached to said frame, thereby unable to cooperatively rotate with respect said inner and outer support means, for withdrawing of filmstrip from said cavity while said inner and outer support means rotate.

25. A device according to claim 24 wherein said removal means comprises a guide roller having width commensurate with the width of said filmstrip, said roller having an adjustable pressure clutch attached to the shaft of said roller for the supplying of filmstrip at a predetermined tension.

26. A device according to claim 24 wherein said removal means is configured to twist the filmstrip as it is removed from said cavity, thereby reducing the tension of the filmstrip necessary to release said filmstrip from the interior of said cavity.

27. A device according to claim 24 wherein said removal means comprises unwinding means, coupled to such drive means, for causing the synchronous rotation by said drive means of said inner and outer support means when filmstrip is manually withdrawn from said cavity, said removal means thereby assisting in the providing of filmstrip for threading through a filmstrip utilization device.

* * * * *